(12) United States Patent
Davi et al.

(10) Patent No.: US 8,956,100 B2
(45) Date of Patent: Feb. 17, 2015

(54) TURBO MACHINE SERVICE APPARATUS

(75) Inventors: Michael Alan Davi, Niskayuna, NY (US); Paul Robert Fernandez, Woodstock, GA (US); John William Herbold, Fountain Inn, SC (US); Andrew Thomas Hynous, Greenville, SC (US); Sean O'Meara, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 6 days.

(21) Appl. No.: 13/463,044

(22) Filed: May 3, 2012

(65) Prior Publication Data
US 2013/0292229 A1 Nov. 7, 2013

(51) Int. Cl.
*B60P 3/40* (2006.01)
(52) U.S. Cl.
USPC .............. 414/334; 414/402; 414/387; 410/45
(58) Field of Classification Search
CPC ....................................................... B60P 3/40
USPC ............ 198/465.1; 410/44, 45; 414/334, 387, 414/402
See application file for complete search history.

(56) References Cited

U.S. PATENT DOCUMENTS

| | | | | |
|---|---|---|---|---|
| 3,987,594 A * | 10/1976 | Rao et al. | | 52/111 |
| 4,136,432 A * | 1/1979 | Melley, Jr. | | 29/469 |
| 4,171,114 A * | 10/1979 | Marden | | 244/116 |
| 4,685,983 A * | 8/1987 | Long, Jr. | | 156/64 |
| 4,746,260 A * | 5/1988 | Norvell | | 414/460 |
| 4,915,577 A * | 4/1990 | Fraser | | 414/476 |
| 5,417,539 A * | 5/1995 | van der Wal | | 414/458 |
| 5,662,450 A * | 9/1997 | Roberts | | 414/347 |
| 6,334,746 B1 * | 1/2002 | Nguyen et al. | | 410/44 |
| 6,602,040 B1 * | 8/2003 | Petitto | | 414/517 |
| 7,717,193 B2 * | 5/2010 | Egilsson et al. | | 175/24 |
| 7,806,207 B1 | 10/2010 | Barnes et al. | | |
| 8,172,493 B2 * | 5/2012 | Tobergte | | 410/44 |
| 8,322,965 B2 * | 12/2012 | Smith | | 414/482 |
| 8,424,897 B1 * | 4/2013 | Sutton et al. | | 280/444 |
| 2005/0067172 A1 * | 3/2005 | Belvis | | 169/68 |
| 2008/0231016 A1 | 9/2008 | Wall | | |
| 2011/0017245 A1 * | 1/2011 | Vernon et al. | | 134/122 R |
| 2012/0183379 A1 * | 7/2012 | Jones | | 414/339 |

FOREIGN PATENT DOCUMENTS

EP 1953038 A1 8/2008

* cited by examiner

*Primary Examiner* — Gene Crawford
*Assistant Examiner* — Thomas Randazzo
(74) *Attorney, Agent, or Firm* — Ernest G. Cusick; Hoffman Warnick LLC (57) ABSTRACT

Solutions for minimizing the impact of servicing a turbo machine are disclosed. In one embodiment, an apparatus for conveying a turbo machine component can include: a motive system for moving the apparatus along a surface; a platform system operably connected to the motive system, the platform system for supporting the component of the turbo machine, the platform system can include: a first portion fixed to the motive system; and a second portion moveably coupled to the first portion, the second portion for modifying a position of the turbo machine component; and a control system operably connected to the platform system, the control system for controlling at least one of a rate of movement or a direction of the second portion of the platform system.

15 Claims, 4 Drawing Sheets

TURBO MACHINE SERVICE APPARATUS

FIELD OF THE INVENTION

Aspects disclosed herein relate to turbo machines. More particularly, aspects of the disclosure relate to service of turbo machines.

BACKGROUND OF THE INVENTION

Conventionally, servicing turbo machines (e.g., turbines such as steam and/or gas turbines) can be time-consuming and expensive. A turbo machine operator can lose productivity for time lost while a turbo machine is offline. Further, as turbo machines are often housed in protective enclosures, a turbo machine operator spends additional time and money preparing and making accommodations for servicing a turbo machine. Traditionally, when turbo machine components are moved, a turbo machine operator/owner/contractor may hire one or more flatbed trailers and rent the tools needed to facilitate the move. Generally, a turbo machine is broken down into components that require movement from one location to another location. As the flatbed trailers and tools are not specifically designed for the task, the process is cumbersome, costly, time-consuming and typically is not optimized from a safety standpoint.

BRIEF DESCRIPTION OF THE INVENTION

Solutions for minimizing the impact of servicing a turbo machine are disclosed. In one embodiment, an apparatus for conveying a turbo machine component can include: a motive system for moving the apparatus along a surface; a platform system operably connected to the motive system, the platform system for supporting the component of the turbo machine, the platform system can include: a first portion fixed to the motive system; and a second portion moveably coupled to the first portion, the second portion for modifying a position of the turbo machine component; and a control system operably connected to the platform system, the control system for controlling at least one of a rate of movement or a direction of the second portion of the platform system.

A first aspect of the invention provides an apparatus for conveying a turbo machine component, the apparatus can include: a motive system for moving the apparatus along a surface; a platform system operably connected to the motive system, the platform system for supporting the turbo machine component, the platform system can include: a first portion coupled to the motive system; and a second portion moveably coupled to the first portion, the second portion for modifying a position of the turbo machine component; and a control system operably connected to the platform system, the control system for controlling at least one of a rate of movement or a direction of the second portion of the platform system.

A second aspect of the invention provides a system for conveying a turbo machine component, the system can include: a propulsion system for moving the system along a surface; and a mobile base system removably coupled to the propulsion system, the mobile base system can include: a platform system for supporting the turbo machine component, the platform system can include: a first portion having an attachment device for coupling the first portion to the propulsion system; and a second portion moveably coupled to the first portion, the second portion for modifying a position of the turbo machine component; and a control system operably connected to the platform system, the control system for controlling at least one of a rate of movement or a direction of the second portion of the platform system.

A third aspect of the invention provides an apparatus for conveying a turbo machine component, the apparatus can include: a motive system for moving the apparatus along a surface; a platform system operably connected to the motive system, the platform system for supporting the turbo machine component, the platform system can include: a first portion coupled to the motive system; a second portion moveably coupled to the first portion, the second portion for modifying a position of the turbo machine component; and at least one fastener coupled to the platform system for fastening the turbo machine component to the platform system; a rotating tool storage unit coupled to the platform system having at least one of a hook or a hanger for storing at least one subcomponent from the turbo machine component; and a control system operably connected to the platform system, the control system for controlling at least one of a rate of movement or a direction of the second portion of the platform system.

A fourth aspect of the invention provides a method for providing service on a turbo machine component, the method can include: obtaining a turbo machine service apparatus that can include: a motive system for moving the apparatus along a surface; a platform system operably connected to the motive system, the platform system for supporting the turbo machine component, the platform system can include: a first portion coupled to the motive system; and a second portion moveably coupled to the first portion, the second portion for modifying a position of the turbo machine component; and a control system operably connected to the platform system, the control system for controlling at least one of a rate of movement or a direction of the second portion of the platform system; and performing service on the turbo machine component using the turbo machine service apparatus.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As noted herein, various embodiments of the invention relate to turbo machines and/or turbo machine components, which can include turbines, casings, liners, flow sleeves, nozzles, shells, valves, end shields, load gears, clutches, fans/blowers, etc. In particular, various embodiments relate to minimizing the impact of downtime due to servicing a turbo machine and/or turbo machine component. As used herein, it is understood that service and/or servicing a turbo machine and/or turbo machine component can include inspecting, moving, maintaining, replacing and/or repairing the turbo machine and/or turbo machine component.

Conventionally, servicing a turbo machine can be a time-consuming and expensive process that often requires extensive planning to reduce any effect on productivity. Typically, extensive planning is needed because turbo machines can be housed and operated within protective enclosures. Generally, turbo machine components can be moved outside of their protective enclosure to conduct service on the turbo machine components, including inspection, movement, maintenance, replacement and/or repairs. Traditionally, when components are moved, a turbo machine operator/owner/contractor may hire one or more flatbed trailers and rent the equipment needed to facilitate the move. Typically, a turbo machine is broken down into their component parts and the flatbed trailers are used to move the larger turbo machine components to a service staging area. Generally, a service staging area can be a large outdoor area. Traditionally, the area used is an improvised accommodation that includes temporary structures, such as: tarps, tents, ladders and/or scaffolding, which may not adhere to industry standards. As the flatbed trailers and tools are not specifically designed for this task, the process is cumbersome, costly, time-consuming and may not provide optimal environmental health and safety practices.

In contrast to conventional systems, various embodiments of the invention can provide a more effective solution for efficiently moving turbo machine components in and out of a building or protective enclosure for servicing the turbo machine and/or turbo machine component. These apparatuses and systems can reduce the cost and amount of time required to service a turbo machine. These apparatuses and systems can perform a variety of functions without the need to rent multiple flatbed trailers or hire specially licensed vehicle operators.

Various particular embodiments of the invention can include an apparatus for conveying a turbo machine component (e.g., steam turbine, shells, valves or hoods, generator end shields and/or gas turbine casings, compressor, combustion and turbine or other accessories/components, etc.). The apparatus can include a motive system, a control system operably connected to the motive system, and a platform system operably connected to the motive system. The motive system can move the apparatus along a surface. The platform system can support a turbo machine component and/or a turbo machine. The platform system can include two portions. A first portion of the platform system fixed to the motive system and a second portion moveably coupled to the first portion. The second portion can modify a position of the turbo machine component.

The apparatus, in various embodiments, may be used to service a turbo machine component, which can include inspection, movement, maintenance, replacement and/or repair. The process of servicing a turbo machine component can include: disassembling the turbo machine into components, moving the turbo machine components, setting up an alternate work area to service (e.g. inspect, maintain, repair, etc.) the turbo machine component, and returning the turbo machine components to the original area. In these embodiments, the apparatus can move proximate to the turbo machine, wherein the tools, the instruments and the systems on the apparatus may be used to service the turbo machine. In some embodiments, the tools, instruments and systems on the apparatus can be used to disassemble the turbo machine into component pieces. The apparatus can, subsequently, move these component pieces to an alternate work area. In many embodiments, at the alternate work area, the apparatus can extend a guard system that can protect and/or enclose at least a portion of the apparatus and the turbo machine component. After service is completed, the apparatus can move the turbo machine component back to the original location.

In various embodiments, a propulsion system can push and/or pull the apparatus. The propulsion system can include a tug, forklift and/or a pickup truck. In some embodiments, the apparatus may be self-propelled and/or self-powered. In many embodiments, a human operator may operate the apparatus without a special operator license. In other embodiments, the propulsion system may be used to power the apparatus. In some embodiments, the apparatus can have a guard system to protect a turbo machine component from the elements and/or environment. In many embodiments, the guard system can be removable. In other embodiments, the guard system can be retractable and/or expandable to create enclosures of different sizes. In various embodiments, the guard system can protect the environment from any turbo machine component service byproducts (e.g., excess paint, oil, particles or particulates from grit blasting operations, grinding, machining operations, etc.). In other embodiments, the guard system can protect human operators or technicians, in addition to the turbo machine component, from the environment.

Figure 1:
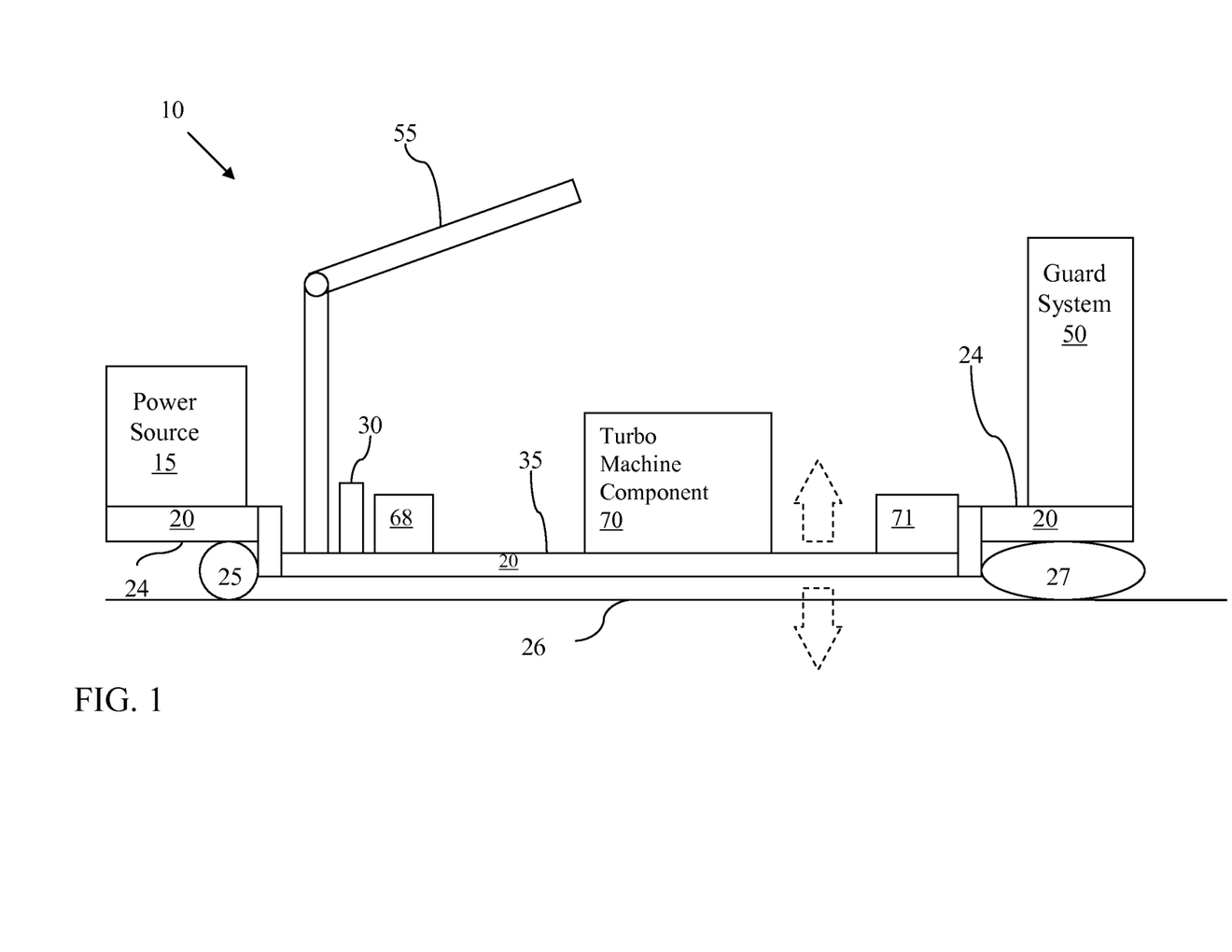
FIG. 1 shows a schematic side view of the apparatus according to various embodiments described in the disclosure.

Turning to FIG. 1, a schematic side view of an apparatus 10 (a turbo machine service apparatus) is shown according to various embodiments of the invention. In FIG. 1, the apparatus 10 can include a platform system 20, which can be operably connected to the motive system. The motive system can include a set of wheels 25 or a track system 27 for enabling the platform system 20 to move along a surface 26. In various embodiments, the surface 26 may reference a ground surface, either in an ambient environment (outdoors), or in an enclosed space such as within a facility. In some embodiments, the motive system may house an engine or on-board motor for powering the set of wheels 25 or track system 27 enabling the apparatus 10 to move under its own power. In various embodiments, the set of wheels 25 or track system 27 can rotate to enable the apparatus 10 to move, turn or rotate.

As shown in FIG. 1, the platform system 20 can include a first portion 24 and a second portion 35, wherein the first portion 24 can be coupled to a set of wheels 25 or a track system 27 and the second portion 35 can be sized to fit a turbo machine component 70. One with skill in the art would recognize that a turbo machine component 70 could include: a rotor, a casing, a shell, a diaphragm, a stator, a vane, a blade, a combustor, a valve, etc. The second portion 35 of the platform system 20 can be moved relative to the first portion 24 along an axis perpendicular to the surface 26 in the directions shown by the phantom arrows. In various embodiments, the second portion 35 can be moved using an adjustment system 71. One with skill in the art would recognize that the adjustment system 71 could include: a hydraulic adjustment system, an electric adjustment system, a pneumatic adjustment system, or equivalent system. In some embodiments, the second portion 35 can be positioned flush with the surface 26 to facilitate loading a turbo machine component 70 onto the apparatus 10. In other embodiments, the second portion 35 can be positioned above the first portion to create an increased distance between the second portion 35 and the surface 26. Although FIG. 1 shows platform system 20 including first portion 24 and second portion 35, one skilled in the art will appreciate that the platform system 20 can have more, or less, portions.

As shown in FIG. 1, in many embodiments, platform system 20 can house and/or support various systems, tools and instruments for servicing a turbo machine, including: a power source 15, a guard system 50, a lifting device 55, or a service device 68 capable of being used to service the turbo machine component 70. The service device 68 can include service tools or service instruments. In various embodiments, the power source 15 can power a variety of service tools, such as: a powered drill, a powered screwdriver, an impact driver, power winches, grit blaster, grinder, welder or other turbo machine service tools. In other embodiments, the power source 15 can power a variety of service instruments (e.g., scopes, borescopes, dye penetrants, ultrasonic instruments, gauges, optical measuring devices, etc.). In some embodiments, the service devices 68 can be operably connected to the platform system 20. In other embodiments, the service devices 68 can facilitate moving the apparatus 10. For example, a service device 68, such as a power winch can be used to pull the apparatus 10 when needed. In many embodiments, the power source 15 could include: a hydraulic power source, a pneumatic power source, an electrical generator, or an equivalent power source.

The platform system 20 can store the guard system 50 in a retracted or stored state. In various embodiments, the guard system 50 can extend and/or unfold to create a protective enclosure for the apparatus 10. In some embodiments, the guard system 50 can enclose the apparatus 10; in other embodiments, the guard system 50 can enclose an area larger than the apparatus 10. In many embodiments, the guard system 50 can provide external environmental protection (wind, rain, snow, etc.). In other embodiments, the guard system 50 can keep pollutants from the environment, wherein the pollutants could include: filings, weld slag, metal chips, paint, dye penetrants, and/or grid blast material. One with skill in the art would recognize that the guard system 50 can be constructed with plastic, canvas, fiberglass or other suitable material that can offer external environmental protection and/or provide the capability to retain pollutants.

In various embodiments, the platform system 20 can include a lifting device 55 for modifying the position of the turbo machine component 70. In many embodiments, the lifting device 55 may include: a hoist, winch, pulley device, etc. The lifting device 55 can move the turbo machine component 70 on the second portion 35 of the platform system 20. In some embodiments, the platform system 20 may include a stabilization unit 30 to counteract any de-stabilizing forces on the platform system 20 created from using the lifting device 55. In various embodiments, the stabilization units 30 can hold the platform system 20 at a pre-set position while the lifting device 55 may be lifting the turbo machine component 70. In some embodiments, the stabilization units 30 can be mechanical arms, controlled by the control system 60, enabled to extend to the surface 26 to stabilize the platform system 20.

Figure 2:
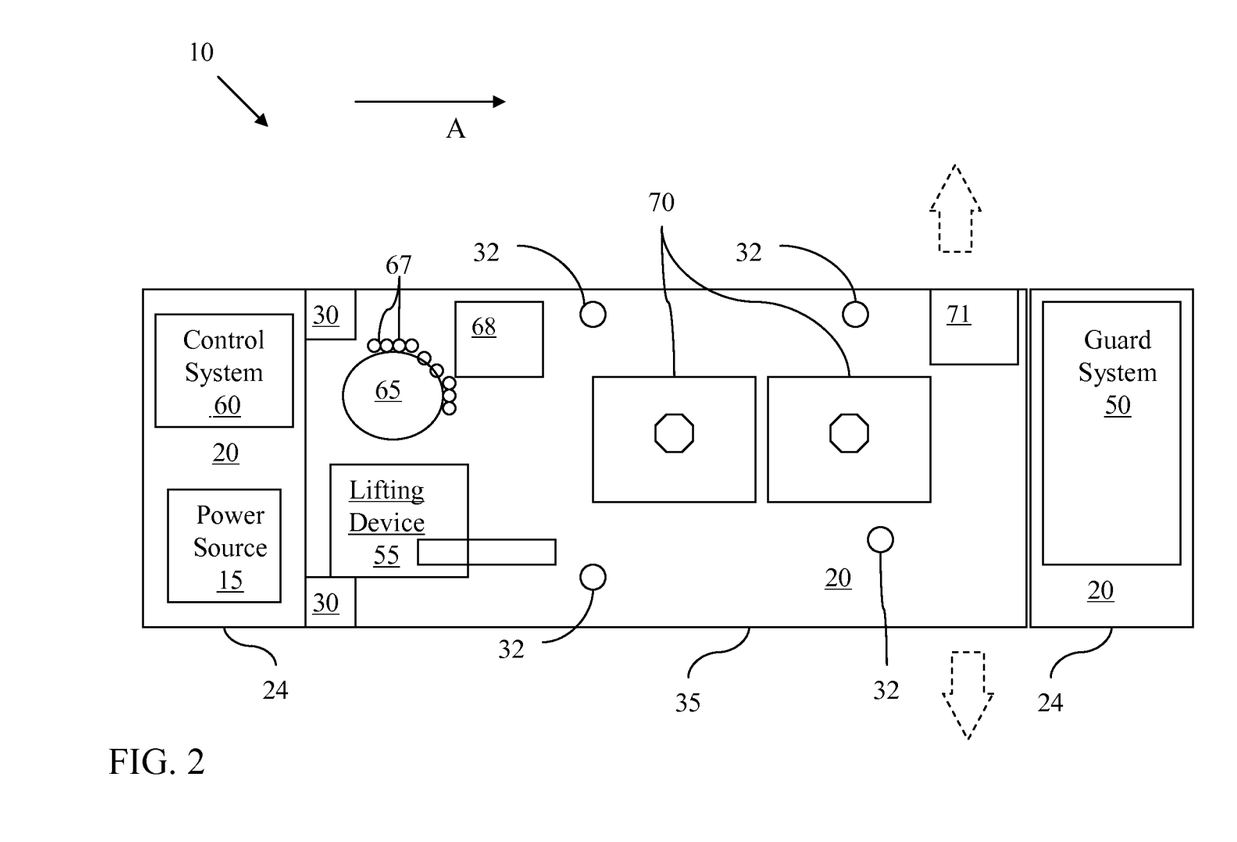
FIG. 2 shows a schematic top view of the apparatus of FIG. 1 according to various embodiments described in the disclosure.

Turning to FIG. 2, with continuing reference to FIG. 1, a schematic top view of the apparatus 10 is shown according to various embodiments of the invention. As shown in FIG. 2, the second portion 35 of the platform system 20 supports a turbo machine component 70. In some embodiments, the surface of second portion 35 can include a set of fasteners 32 for securing the turbo machine component 70 to the platform system 20. The set of fasteners 32 can be arranged on the platform system 20 to hold the turbo machine component 70 in an orientation similar to when the turbo machine component 70 is in use. The set of fasteners 32 can include casings, support stands, case rollover stands, rotor stands, lockdown systems, bolts or ratcheting tie-down restraint systems for securing the turbo machine component 70 to the platform system 20. In many embodiments, the set of fasteners 32 can hold the turbo machine component 70 in place, while on the platform system 20. The set of fasteners 32 can hold the turbo machine component 70 while conducting service, enabling human operators, or technicians, to work safely on the turbo machine component 70. In other embodiments, the platform system 20 can store turbo machine sub-components (e.g., fuel flex lines, combustion liners, etc.). In some embodiments, a storage device can be mounted onto the platform system 20. In various embodiments, a rotating storage device 65 can be mounted onto the platform system 20. The rotating storage device 65 can hold one or more small components 67 around its perimeter and/or store parts from the turbo machine component 70 within. In some embodiments, the small components 67 can be attached to the rotating storage device 65 using hooks, hangers, or other attachment devices attached to the outer surface of the rotating storage device 65. In various embodiments, the small components 67 can include turbo machine component 70 hosing, wherein the hosing can be stored according to size.

In various embodiments of the invention, the control system 60 can be operably coupled to the apparatus 10. In some embodiments, the control system 60 can monitor and direct the operation of one or more devices located on the apparatus 10, such as: the power source 15, the lifting device 55, the second portion 35 of the platform system 20, the guard system 50 or the motive system. In many embodiments, the control system 60 can control at least one of a rate of movement, a direction of movement, or an amount of power supplied to the motive system. The control system 60 can control the rate of movement by regulating an amount of power the motive system provides the set of wheels 25 (FIG. 1) and/or track system 27 (FIG. 1). The control system 60 can control the direction of movement by modifying a position of the set of wheels 25 (FIG. 1) and/or track system 27 (FIG. 1). In various embodiments, the control system 60 may be removable and operated remotely from the apparatus 10. In other embodiments, each system can have individual controls for each respective system. In various embodiments, the second portion 35 of the platform system 20 can move perpendicularly to a primary axis A of the apparatus 10 indicated by phantom arrows. In many embodiments, the service device 68 can be used to disassemble a turbo machine into turbo machine components 70.

Figure 3:
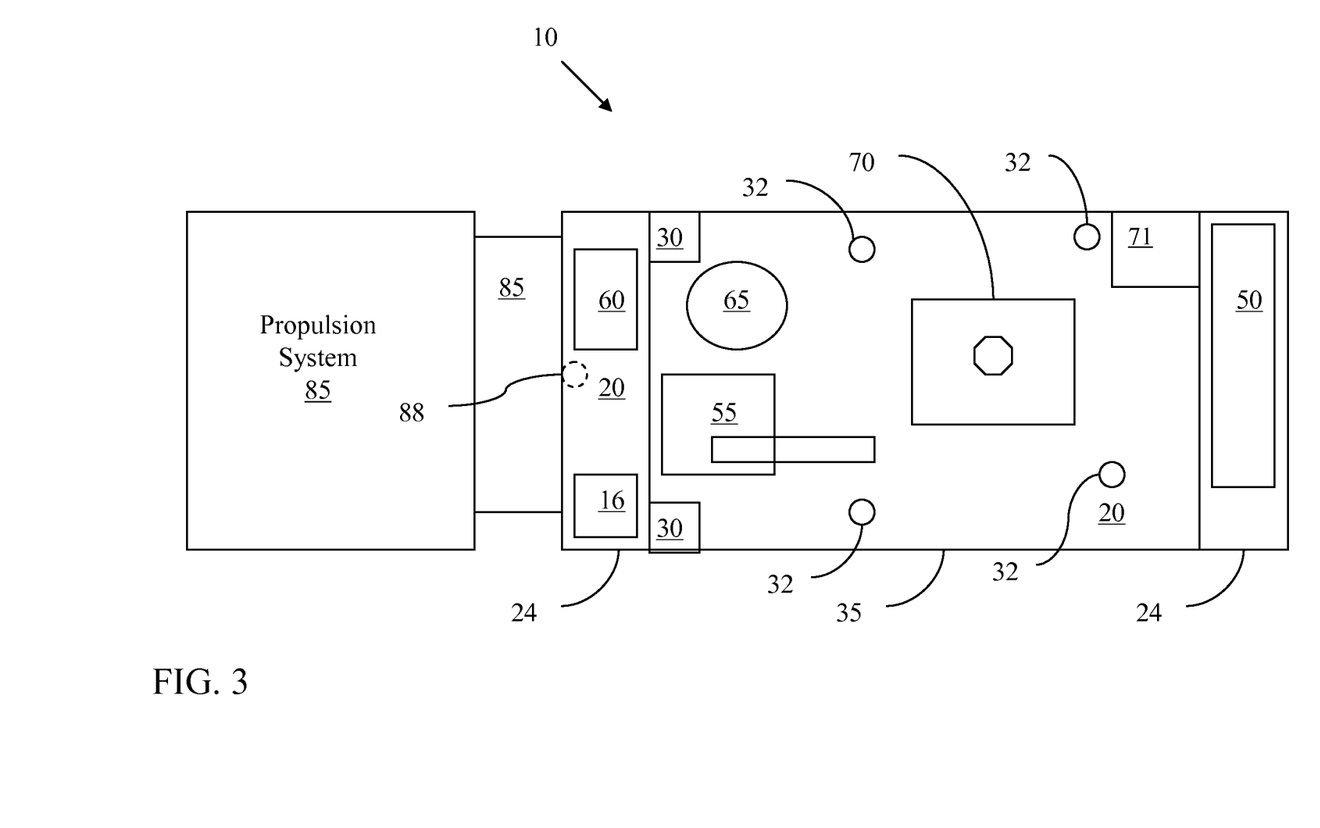
FIG. 3 shows a schematic top view of the apparatus of FIGS. 1-2 according to various embodiments described in the disclosure.

Turning to FIG. 3, with continuing references to FIGS. 1 and 2, a schematic top view of the apparatus is shown according to various embodiments of the invention. In some embodiments, the apparatus 10 can be powered and/or moved by a propulsion system 85, wherein the propulsion system can push or pull the apparatus 10. In various embodiments, the propulsion system 85 can be at least one of a pushback tractor, a tug, a forklift, a pickup truck, or similar vehicle. The apparatus can be removably coupled to the propulsion system 85 by using an attachment device 88. One with skill in the art would appreciate that the attachment device 88 could include: a hitch, a coupling device, etc.

Figure 4:
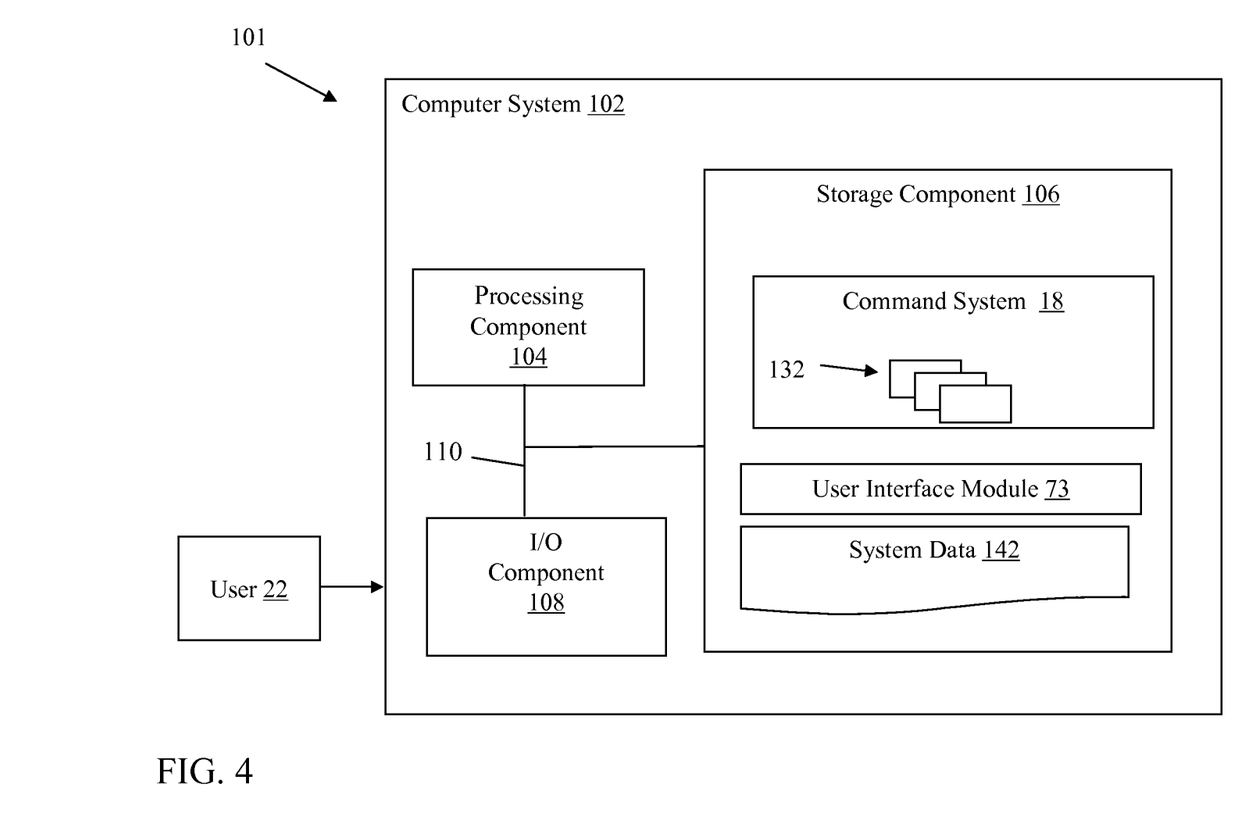
FIG. 4 shows an illustrative environment, including a control system, according to embodiments described in the disclosure.

FIG. 4 depicts an illustrative environment 101 for controlling the apparatus 10 (FIG. 1) using control system 60 (FIG. 2) according to embodiments. To this extent, the environment 101 includes a computer system 102 that can perform processes and execute commands to control the apparatus 10 (FIG. 1) and associated systems and tools. In particular, the computer system 102 is shown as including a command system 18, which makes computer system 102 operable to direct and operate the apparatus 10 (FIG. 1) and associated systems and tools described herein and implementing any/all of the embodiments described herein.

The computer system 102 is shown including a processing component 104 (e.g., one or more processors), a storage component 106 (e.g., a storage hierarchy), an input/output (I/O) component 108 (e.g., one or more I/O interfaces and/or devices), and a communications pathway 110. In general, the processing component 104 executes program code, such as command system 18, which is at least partially fixed in the storage component 106. While executing program code, the processing component 104 can process data, which can result in reading and/or writing transformed data from/to the storage component 106 and/or the I/O component 108 for further processing. The pathway 110 provides a communications link between each of the components in the computer system 102. The I/O component 108 can comprise one or more human I/O devices, which enable a human user 22 to interact with the computer system 102 and/or one or more communications devices to enable a system user 22 to communicate with the computer system 102 using any type of communications link. To this extent, the command system 18 can manage a set of interfaces (e.g., graphical user interface(s), application program interface, etc.) that enable human and/or system users 22 to interact with the command system 18. Further, the command system 18 can manage (e.g., store, retrieve, create, manipulate, organize, present, etc.) data, such as system data 142 (including position, speed, acceleration, etc.) using any solution.

In any event, the computer system 102 can comprise one or more general-purpose computing articles of manufacture (e.g., computing devices) capable of executing program code, such as the command system 18, installed thereon. As used herein, it is understood that "program code" means any collection of instructions, in any language, code or notation, that cause a computing device having an information processing capability to perform a particular function either directly or after any combination of the following: (a) conversion to another language, code or notation; (b) reproduction in a different material form; and/or (c) decompression. To this extent, the command system 18 can be embodied as any combination of system software and/or application software.

Further, the command system 18 can be implemented using a set of modules 132. In this case, a module 132 can enable the computer system 102 to perform a set of tasks used by the command system 18, and can be separately developed and/or implemented apart from other portions of the command system 18. As used herein, the term "component" means any configuration of hardware, with or without software, which implements the functionality described in conjunction therewith using any solution, while the term "module" means program code that enables the computer system 102 to implement the functionality described in conjunction therewith using any solution. When fixed in a storage component 106 of a computer system 102 that includes a processing component 104, a module is a substantial portion of a component that implements the functionality. Regardless, it is understood that two or more components, modules and/or systems may share some/all of their respective hardware and/or software. Further, it is understood that some of the functionality discussed herein may not be implemented or additional functionality may be included as part of the computer system 102.

When the computer system 102 comprises multiple computing devices, each computing device may have only a portion of the command system 18 fixed thereon (e.g., one or more modules 132). However, it is understood that the computer system 102 and command system 18 are only representative of various possible equivalent computer systems that may perform a process described herein. To this extent, in other embodiments, the functionality provided by the computer system 102 and command system 18 can be at least partially implemented by one or more computing devices that include any combination of general and/or specific purpose hardware with or without program code. In each embodiment, the hardware and program code, if included, can be created using standard engineering and programming techniques, respectively.

Regardless, when the computer system 102 includes multiple computing devices, the computing devices can communicate over any type of communications link. Further, while performing a process described herein, the computer system 102 can communicate with one or more other computer systems using any type of communications link. In either case, the communications link can comprise any combination of various types of wired and/or wireless links; comprise any combination of one or more types of networks; and/or utilize any combination of various types of transmission techniques and protocols.

While shown and described herein as an apparatus and system for conveying turbo machine components, it is understood that aspects of the invention further provide various alternative embodiments. For example, in one embodiment, the invention provides a method for providing service on a turbo machine having a turbo machine component. The method can include obtaining a turbo machine service apparatus and using the turbo machine service apparatus to perform service on the turbo machine or turbo machine component. In other embodiments, using the turbo machine service apparatus can include removing the turbo machine component from the turbo machine, placing the turbo machine component on the platform system of the turbo machine service apparatus or moving the turbo machine component to an alternate work area. One with skill in the art would recognize that service can include: inspection, maintenance, repair, replacement, moving a turbo machine and/or component, cleaning a turbo machine and/or component, painting a turbo machine and/or component, etc.

In another embodiment, the invention provides a computer program fixed in at least one computer-readable medium, which when executed, enables a computer system to operate and direct the apparatus to convey a turbo machine component. To this extent, the computer-readable medium includes program code, such as the command system 18 (FIG. 4), which implements some or all of the processes and/or embodiments described herein. It is understood that the term "computer-readable medium" comprises one or more of any type of tangible medium of expression, now known or later developed, from which a copy of the program code can be perceived, reproduced or otherwise communicated by a computing device. For example, the computer-readable medium can comprise: one or more portable storage articles of manufacture; one or more memory/storage components of a computing device; paper; etc.

In still another embodiment, the invention provides a method of providing a copy of program code, such as the command system 18 (FIG. 4) which implements some or all of a process described herein. In this case, a computer system can process a copy of program code that implements some or all of a process described herein to generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of program code that implements some or all of a process described herein, which includes a computer system receiving the set of data signals described herein, and translating the set of data signals into a copy of the computer program fixed in at least one computer-readable medium. In either case, the set of data signals can be transmitted/received using any type of communications link.

Although various embodiments of the present invention have been described here with respect to servicing turbo machines, those skilled in the art will appreciate that these embodiments may be suitable for use in other applications where it is desirable to move, assemble, disassemble, inspect, repair, replace or maintain a device and/or machine (e.g., auto industry, assembly plants, industrial manufacturing, maintenance of heavy machinery, etc.). For example, the various embodiments of the apparatus may be used to service machinery such as aircraft engines, automobiles, construction equipment, industrial machines, etc.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. An apparatus for conveying a turbo machine component, the apparatus comprising:
   a motive system for moving the apparatus along a surface;
   a platform system operably connected to the motive system, the platform system oriented substantially parallel to the surface for supporting the turbo machine component and including:
      a first portion coupled to the motive system,
      wherein the first portion includes a front platform and a rear platform that is substantially parallel to the front platform; and
      a second portion substantially parallel to and moveably coupled to the first portion,
      wherein the second portion is located between the front platform and the rear platform,
      the second portion configured to move relative to the first portion in either of a direction that is substantially perpendicular to the surface or a direction that is substantially perpendicular to a direction of travel of the apparatus along the surface,
      wherein the second portion is configured to move relative to the first portion in only one of either the direction that is substantially perpendicular to the surface or the direction that is substantially perpendicular to the direction of travel at a time,
      wherein the second portion is further configured such that it can be positioned above the first portion to increase the distance between the second portion and the surface,
      wherein the second portion is further configured such that it can be positioned flush with the surface to facilitate the loading of the turbo machine component on to the platform system,
      the second portion for modifying a position of the turbo machine component;
   at least one fastener coupled to the platform system for fastening the turbo machine component to the platform system,
   wherein the at least one fastener includes a turbo machine rotor stand for holding a turbo machine rotor in place;
   a lifting device operably coupled to the platform system for modifying the position of the turbo machine component;
   a guard system removably coupled to the platform system,
   wherein the guard system is convertible into one of a plurality of positions including a removed position, a retracted position, and an expanded position, wherein the guard system is detached from the platform system when in the removed position, encloses the apparatus when in the retracted position, and encloses an area larger than the apparatus and a human operator when in the expanded position, and wherein a composition of the guard system blocks pollutants from entering an area enclosed within the guard system; and
   a control system operably connected to the platform system, the control system for controlling at least one of the lifting device, the plurality of positions of the guard system, a rate of movement or a direction of the second portion of the platform system.

2. The apparatus of claim 1, further comprising:
   an adjustment system engagably coupled to the platform system and operably connected to the control system, the adjustment system for modifying the position of the turbo machine component by moving the second portion of the platform system with respect to the first portion of the platform system.

3. The apparatus of claim 1, further comprising:
   at least one service device operably connected to the platform system, the at least one service device designed to operate on the turbo machine component, wherein the at least one service device includes one of a scope, a borescope, an ultrasonic instrument, or an optical measuring device; and
   a power system operably coupled to the at least one service device, the power system for powering the at least one service device, wherein the power system includes at least one of a hydraulic power source, a pneumatic power source, or an electrical power source.

4. The apparatus of claim 1, wherein the motive system includes at least one of a track system or a set of wheels.

5. The apparatus of claim 1, wherein the guard system in the expanded position creates a protective enclosure for the apparatus and provides external environmental protection for the apparatus and the human operator.

6. The apparatus of claim 1, further comprising a stabilization unit for stabilizing the platform system.

7. The apparatus of claim 6, further comprising a storage unit coupled to the platform system, the storage unit having at least one of a hook or a hanger for storing at least one part of the turbo machine component.

8. A system for conveying a turbo machine component, the system comprising:
- a propulsion system for moving the system along a surface; and
- a mobile base system removably coupled to the propulsion system, the mobile base system including:
  - a platform system for supporting the turbo machine component, the platform system oriented substantially parallel to the surface and including:
    - a first portion having an attachment device for coupling to the propulsion system,
    - wherein the first portion includes a front platform and a rear platform that is substantially parallel to the front platform;
    - a second portion substantially parallel to and moveably coupled to the first portion,
    - wherein the second portion is located in between the front platform and the rear platform, the second portion configured to move relative to the first portion in either of a direction that is substantially perpendicular to the surface or a direction that is substantially perpendicular to a direction of travel of the system along the surface,
    - wherein the second portion is further configured such that it can be positioned flush with the surface to facilitate the loading of the turbo machine component on to the platform system,
    - wherein the second portion is further configured such that it can be positioned above the first portion to increase the distance between the second portion and the surface,
    - wherein the second portion is configured to move relative to the first portion in only one of either a direction that is substantially perpendicular to the surface or a direction that is substantially perpendicular to the direction of travel at a time;
  - at least one fastener coupled to the platform system for fastening the turbo machine component to the platform system,
    - wherein the at least one fastener includes a turbomachine rotor stand for holding a turbomachine rotor in place;
  - a lifting device operably coupled to the platform system for moving the position of the turbo machine component;
  - a guard system removably coupled to the platform system,
    - wherein the guard system is convertible into one of a plurality of positions including a removed position, a retracted position, and an expanded position, wherein the guard system is detached from the platform system when in the removed position, encloses the apparatus when in the retracted position, and encloses an area larger than the system and a human operator when in the expanded position, and wherein a composition of the guard system blocks pollutants from entering an area enclosed within the guard system; and
  - a control system operably connected to the platform system, the control system for controlling at least one of the lifting device, the plurality of positions of the guard system, a rate of movement or a direction of the second portion of the platform system.

9. The system of claim 8, wherein the mobile base system further comprises:
- an adjustment system engagably coupled to the platform system, the adjustment system for modifying the position of the turbo machine component by moving the second portion of the platform system with respect to the first portion of the platform system.

10. The system of claim 8, wherein the mobile base system further comprises a motive system having at least one of a track system or a set of wheels.

11. The system of claim 8, wherein the mobile base system further comprises:
- at least one service device operably connected to the mobile base system for servicing the turbo machine component, wherein the at least one service device includes one of a grit blaster, a grinder, or a welder; and
- a power system coupled to the platform system, the power system for powering the at least one service device.

12. The system of claim 8, wherein the mobile base system further comprises: a rotating tool storage unit coupled to the platform system having at least one attachment for storing at least one sub-component from the turbo machine component, and wherein the propulsion system includes at least one of a tug, a forklift or a truck.

13. The system of claim 8, wherein the guard system in the expanded position creates a protective enclosure for the apparatus and provides external environmental protection for the apparatus and the human operator.

14. An apparatus for conveying a turbo machine component, the apparatus comprising:
- a motive system for moving the apparatus along a surface;
- a platform system operably connected to the motive system, the platform system oriented substantially parallel to the surface for supporting the turbo machine component and including:
  - a first portion coupled to the motive system,
    - wherein the first portion includes a front platform and a rear platform that is substantially parallel to the front platform;
  - a second portion substantially parallel to and moveably coupled to the first portion,
    - wherein the second portion is located in between the front platform and the rear platform, the second portion configured to move relative to the first portion in either of a direction that is substantially perpendicular to the surface or a direction that is substantially perpendicular to a direction of travel of the apparatus along the surface,
    - wherein the second portion is configured to move relative to the first portion in only one of either the direction that is substantially perpendicular to the surface or the direction that is substantially perpendicular to the direction of travel at a time,
    - the second portion further configured such that it can be positioned flush with the surface or positioned above the first portion to increase the distance between the second portion and the surface; and
- at least one fastener coupled to the platform system for fastening the turbo machine component to the platform system,
  - wherein the at least one fastener includes a turbomachine rotor stand for holding a turbomachine rotor in place;
- a guard system removably coupled to the platform system,
  - wherein the guard system is convertible into one of a plurality of positions including a removed position, a retracted position, and an expanded position, wherein the guard system is detached from the platform system when in the removed position, encloses the apparatus when in the retracted position, and encloses an area larger than the apparatus and a human operator when in the expanded position, and wherein a composition of the guard system blocks pollutants from entering an area enclosed within the guard system;

a rotating tool storage unit coupled to the platform system having at least one of a hook or a hanger, for storing at least one sub-component from the turbo machine component; and a control system operably connected to the platform system, the control system for controlling at least one of the plurality of positions of the guard system, a rate of movement of the platform system, or a direction of the second portion of the platform system.

15. The apparatus of claim 13, wherein the guard system in the expanded position creates a protective enclosure for the apparatus and provides external environmental protection for the apparatus and the human operator.

* * * * *